United States Patent [19]
Achleitner et al.

[11] Patent Number: 5,634,330
[45] Date of Patent: Jun. 3, 1997

[54] PROCESS FOR CHECKING A BURNER SYSTEM FOR HEATING A CATALYTIC CONVERTER

[75] Inventors: Erwin Achleitner, Regensburg; Achim Koch, Tegerheim, both of Germany

[73] Assignee: Siemens Aktiengesellschaft, Munich, Germany

[21] Appl. No.: 656,418

[22] Filed: May 30, 1996

Related U.S. Application Data

[63] Continuation-in-part of PCT/DE95/01316, Sep. 22, 1995.

[51] Int. Cl.⁶ .................................................. F01N 3/20
[52] U.S. Cl. ...................... 60/274; 60/276; 60/277; 60/284; 60/286
[58] Field of Search .................. 60/274, 276, 277, 60/284, 285, 286

[56] References Cited

FOREIGN PATENT DOCUMENTS

| 4132814 | 2/1994 | Germany. |
|---|---|---|
| 94/20737 | 9/1994 | WIPO. |
| 94/21901 | 9/1994 | WIPO. |
| 94/21902 | 9/1994 | WIPO. |
| 95/08703 | 3/1995 | WIPO. |

*Primary Examiner*—Douglas Hart
*Attorney, Agent, or Firm*—Herbert L. Lerner; Laurence A. Greenberg

[57]                    ABSTRACT

In order to diagnose a burner air ratio, a fuel/air mixture of an internal combustion engine is either enriched or diluted during operation of the burner as a function of an instantaneous state of the mixture. Resulting signal levels of lambda probes disposed upstream and downstream of the catalytic converter are evaluated.

6 Claims, 2 Drawing Sheets

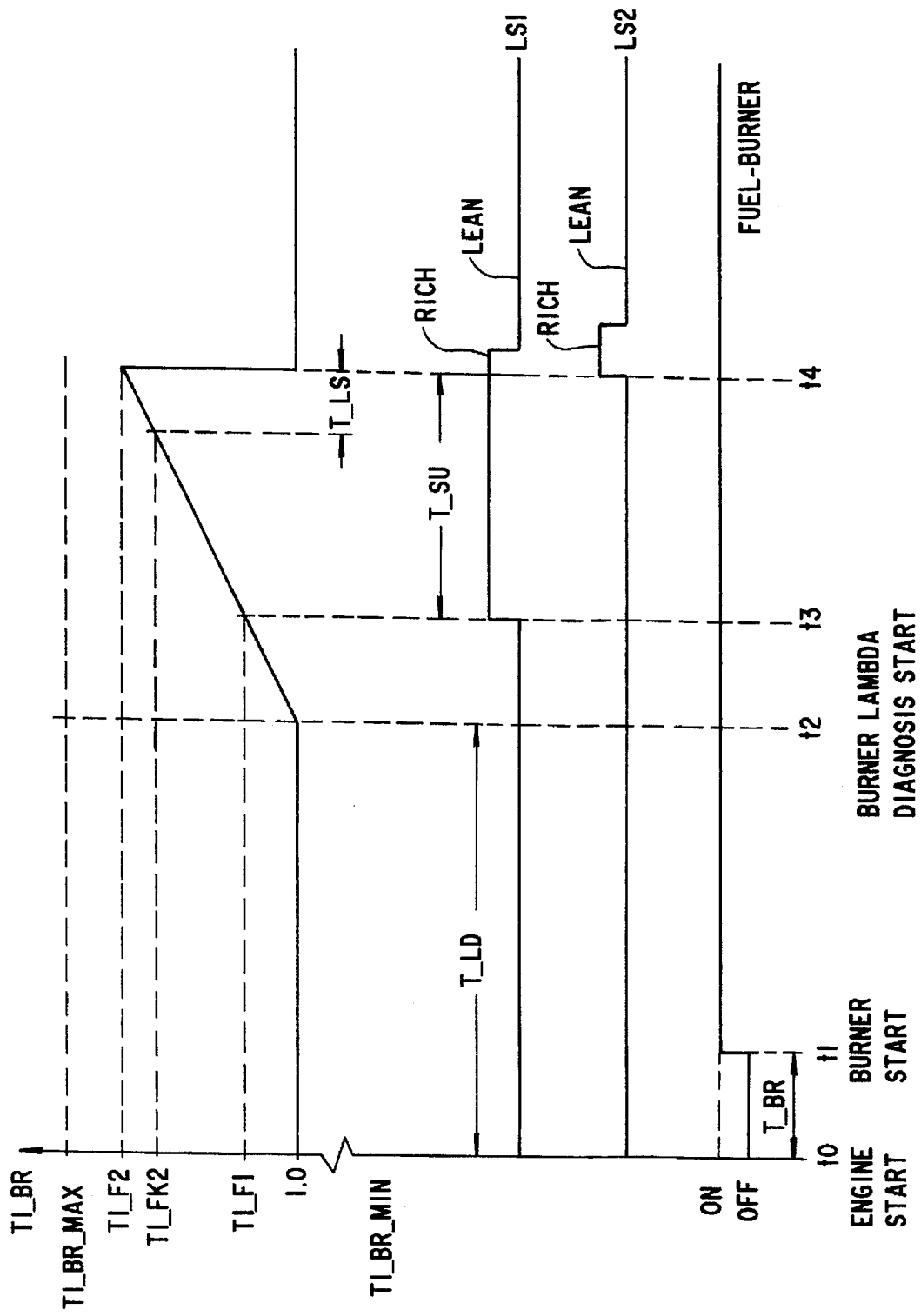

PROCESS FOR CHECKING A BURNER SYSTEM FOR HEATING A CATALYTIC CONVERTER

CROSS-REFERENCE TO RELATED APPLICATION

This application is a Continuation of International Application Serial No. PCT/DE95/01316, filed Sep. 22, 1995.

BACKGROUND OF THE INVENTION

1. Field of the Invention

The invention relates to a process for checking the ability to function of a burner being disposed in an exhaust pipe of an internal combustion engine and being operated with a fuel/air mixture for heating up an exhaust-gas catalytic converter of the internal combustion engine, including a first and a second lambda probe being respectively disposed upstream and downstream of the exhaust-gas catalytic converter, each emitting an output signal corresponding to a respective residual oxygen content in exhaust gas and having signal levels representing either a rich or lean mixture composition.

Pollutant emissions from an internal combustion engine can be reduced in an effective manner by catalytic aftertreatment with a three-way catalytic converter in conjunction with a lambda closed-loop control device. However, an important prerequisite therefor is that both the lambda probe of the closed-loop control device and the catalytic converter have reached their operating temperature. Various heating measures have already been proposed for raising those two components of the exhaust emission control system rapidly to their operating temperature.

While heating the lambda probe, which has a low mass in relation to the catalytic converter, through the use of an electric heating device, presents no technical problems whatsoever, providing the electrical energy from the electrical system of a motor vehicle for rapid heating up of the catalytic converter in many cases exceeds the capacity of the electrical system of the vehicle.

In order to nevertheless reduce pollutant emissions during the cold-starting phase of the internal combustion engine, in which about 70 to 80% of the total HC and CO pollutants are emitted, it is known from German Published, Non-Prosecuted Patent Application DE 41 32 814 A1 to install an additional burner, fed with internal combustion engine fuel, in the exhaust line upstream of the catalytic converter and to thereby heat the catalytic converter rapidly to its operating temperature of about 300° C. (Light-off Temperature). In order to achieve as short a heat-up time as possible, the burner is disposed directly in front of the catalytic converter. The fuel is fed to the burner from a fuel rail in a fuel circuit of the internal combustion engine, and air required for combustion is supplied by a secondary air blower which nowadays is often standard. In conventional practice, such a secondary air blower is used to blow air into the exhaust line of the internal combustion engine near exhaust valves in order to achieve preoxidization of exhaust gases.

Since such a burner is thus part of the overall exhaust system of the internal combustion engine, and the burner also produces its own emissions, the burner must be monitored in terms of its ability to function regarding limiting values to be complied with for pollutant emissions.

On one hand, the burner-specific emissions are influenced not only by the integrity of the burner ignition but also by the air ratio of the burner, and on the other hand, the burner air ratio influences the heating-up behavior of the catalytic converter. The air ratio of the burner is thus relevant to the exhaust gas and must be monitored by suitable measures.

SUMMARY OF THE INVENTION

It is accordingly an object of the invention to provide a process for checking a burner system for heating an exhaust-gas catalytic converter for an internal combustion engine, which overcomes the hereinafore-mentioned disadvantages of the heretofore-known processes of this general type and which permits a simple yet reliable diagnosis of the ability of the burner to function.

With the foregoing and other objects in view there is provided, in accordance with the invention, a process for checking the ability to function of a burner being disposed in an exhaust pipe of an internal combustion engine and being operated with a fuel/air mixture for heating up an exhaust-gas catalytic converter of the internal combustion engine, which comprises placing first and second lambda probes respectively upstream and downstream of the exhaust-gas catalytic converter; emitting output signals from each of the lambda probes corresponding to a respective residual oxygen content in the exhaust gas; representing either rich or lean mixture compositions with signal levels of the output signal; detecting the signal levels of output voltages of both of the lambda probes; enriching or diluting the fuel/air mixture of the internal combustion engine as a function of the signal levels by an enrichment or dilution factor until both lambda probes change their signal levels; detecting values occurring at that time for the enrichment or dilution factor; determining an air ratio of the burner from the values for the enrichment and dilution factors and from air masses fed to the burner and the internal combustion engine during checking; and comparing the air ratio of the burner with predetermined limiting values, and classifying the burner as currently not capable of operating properly if the air ratio of the burner is outside the limiting values.

In accordance with another mode of the invention, there is provided a process which comprises changing the enrichment or dilution factor in steps up to a limiting value.

In accordance with a further mode the invention, there is provided a process which comprises correcting the enrichment or dilution factor at which the output signal of the lambda probe downstream of the catalytic converter changes its signal level by a dead time obtained from a propagation time of exhaust gas between the two probes.

In accordance with an added mode of the invention, there is provided a process which comprises correcting the enrichment or dilution factor by a warm-up factor taking account of a warming up of the internal combustion engine.

In accordance with an additional mode of the invention, there is provided a process which comprises aborting the process if the output signal of the lambda probe upstream of the catalytic converter does not change its signal level within limits for the enrichment or dilution factor.

In accordance with a concomitant mode of the invention, there is provided a process which comprises heating the lambda probes for a predetermined time period before a start of checking the burner.

By virtue of the fact that the air ratio of the burner is used as the criterion for the ability of the burner to function and this air ratio is derived from the signal levels of two lambda probes, one of which is disposed upstream of the catalytic converter, ahead of the burner, and the other of which is disposed after the catalytic converter, and which are present in any case in modern internal combustion engines for the on-board diagnosis of components relevant to the exhaust gas, the burner can be assessed with regard to its ability to function properly without a great outlay and therefore at reasonable cost.

Other features which are considered as characteristic for the invention are set forth in the appended claims.

Although the invention is illustrated and described herein as embodied in a process for checking a burner system for heating a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagram showing a selection of time-dependent signal characteristics during performance of the process according to the invention.

DESCRIPTION OF THE PREFERRED EMBODIMENTS

Figure 1:
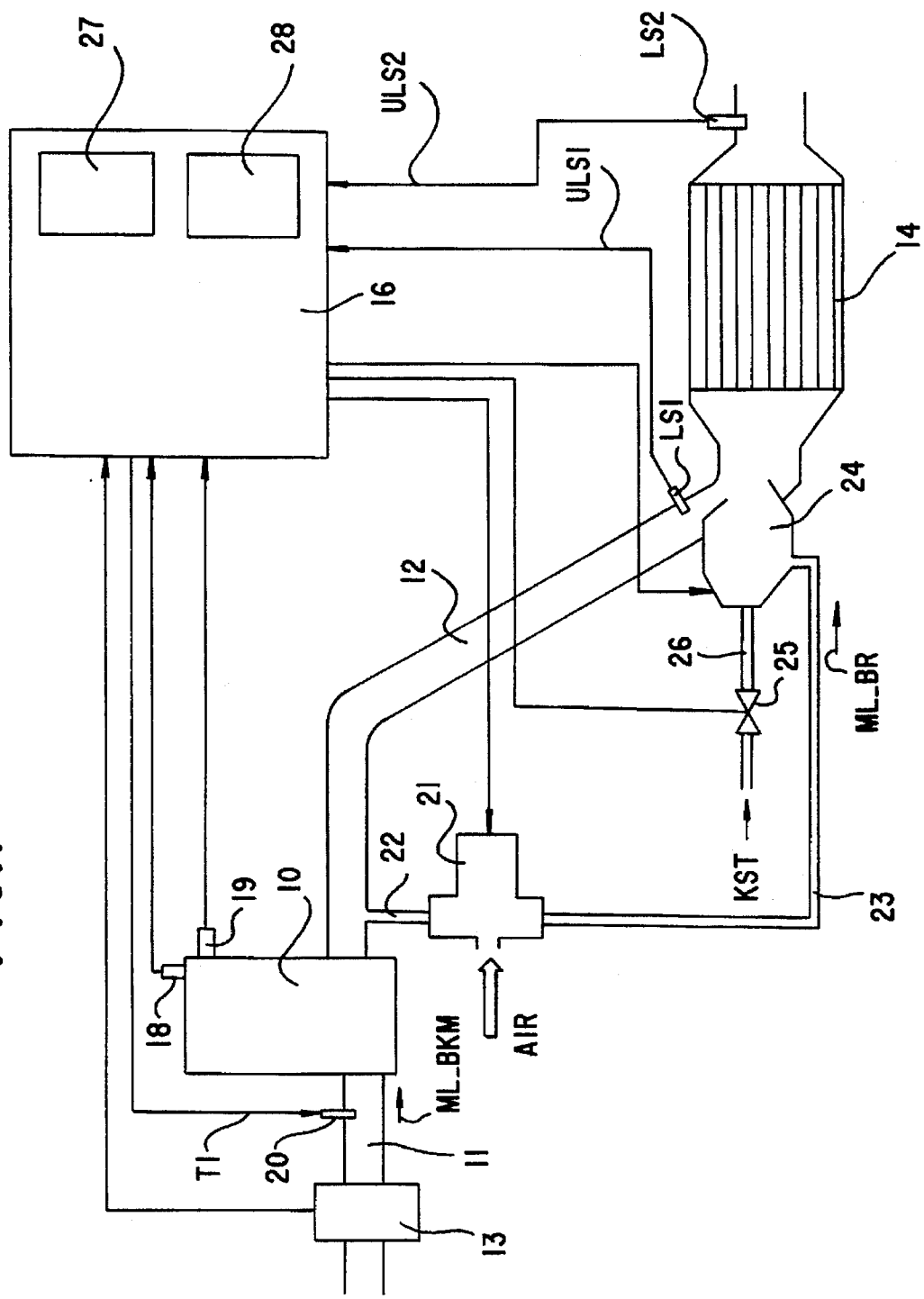
FIG. 1 is a simplified block circuit diagram and diagrammatic view of an internal combustion engine with a catalytic converter and a respective lambda probe upstream and downstream of the catalytic converter.

Referring now in detail to the figures of the drawings, in which only the parts that are necessary for understanding the process according to the invention are shown in simplified form, and first, particularly, to FIG. 1 thereof, it is seen that reference numeral 10 denotes an internal combustion engine with an intake pipe or line 11 and an exhaust pipe or line 12. An air mass meter 13 disposed in the intake line 11 measures the air mass drawn in by the internal combustion engine 10. The air mass meter can be constructed as a hot-wire or hot-film air mass meter. A three-way catalytic converter 14 in the exhaust line 12 serves to convert HC, CO and $NO_x$ components contained in the exhaust gas from the internal combustion engine 10. A first oxygen sensor in the form of a first lambda probe LS1 is inserted into the exhaust line 12 upstream of the three-way catalytic converter 14 and emits an output signal ULS1 to an electronic control device 16 of the internal combustion engine 10 as a function of a residual oxygen content in the exhaust gas. A second lambda probe LS2 is provided downstream of the three-way catalytic converter 14, further along the exhaust line 12. The second lambda probe LS2 emits an output signal ULS2 as a function of a residual oxygen content of the exhaust gas after cleaning by the catalytic converter 14. Preferred probes for use as the lambda probes are what are referred to as "step-change probes", which exhibit a step change in the output signal, for example an output voltage, from a high value (typically 900–1000 mV) in the case of a rich mixture composition ($\lambda<1.00$) to a low value (typically 100–200 mV) in the case of a lean mixture composition ($\lambda>1.00$) ($ZrO_2$ probe) given a stoichiometric mixture composition of the fuel/air mixture of $\lambda=1.00$.

It is furthermore also possible to use step-change probes in which the electrical resistance exhibits a step function at $\lambda=1.00$ ($TiO_2$ probe).

The statement "the lambda probe indicates a rich or lean mixture" in the following description of the exemplary embodiment, which statement is used for the sake of simplicity, is thus equivalent to a situation where the output voltage of the lambda probe assumes a value which represents a rich or lean mixture composition.

The lambda probe LS1 disposed upstream of the catalytic converter 14 serves in a conventional manner as a control element for the lambda closed-loop control of the fuel/air mixture of the internal combustion engine. However, it is possible, by evaluating both the output signals ULS1 of the lambda probe LS1 upstream of the catalytic converter 14 and of the output signals ULS2 of the lambda probe LS2 downstream of the catalytic converter 14, to check the ability to function or efficiency of the catalytic converter 14. It is possible in this case, for example, to make use of the difference between the output signals of the two probes (German Published, Non-Prosecuted Patent Application DE 38 30 515 A1) or the time delay between the output signals of the two probes for the changeover from rich to lean or vice versa as a measure of the efficiency of the catalytic converter (German Published, Non-Prosecuted Patent Application DE 41 01 616 A1).

Furthermore, a sensor 18 for detecting an engine speed or rpm and a coolant-temperature sensor 19 are provided at suitable locations on the internal combustion engine 10. Outputs of the sensors 18, 19 are connected through interfaces to corresponding inputs of the electronic control device 16 for the internal combustion engine 10. Electronic control devices of this kind for internal combustion engines which, in addition to fuel injection, can also assume a multiplicity of other tasks, inter alia on-board diagnosis of components relevant to the exhaust gas, are known per se, and therefore a detailed description of their structure and operation is only given in relation to the present invention in the text which follows.

The heart of the electronic control device 16 is a microcomputer, which controls the necessary functions in accordance with a defined program. In the case of what is referred to as "air-mass-dependent engine control", the signals for air mass and engine speed supplied by the sensors (air-mass meter 13 and engine-speed sensor 18) and conditioned in corresponding circuits are used to calculate a basic injection time or base injection time. Corrections are made to this base injection time as a function of other operating parameters (e.g. pressure and temperature of the intake air, temperature of the coolant, battery voltage, etc.) in such a way that use of the lambda closed-loop control system generally ensures a fuel/air mixture which corresponds to the stoichiometric ratio ($\lambda=1.00$). The fuel for the internal combustion engine 10 is then injected into the intake line 11 with the aid of one or more injection valves 20.

An electrically operated air pump 21, often referred to as a secondary air pump, draws in fresh air through a non-illustrated airline and, when required, pumps this additional air both through a secondary air line 22 into the exhaust line 12 of the internal combustion engine 10 and through a burner-air line 23 to a burner 24 which serves for external heating of the exhaust-gas catalytic converter 14. This burner 24, which is supplied with fuel from the internal combustion engine 10 through a line 26 that has a fuel shut-off valve 25, essentially includes a combustion chamber with a burner nozzle and an ignition device. The burner nozzle is fed with the burner air delivered by the secondary air pump 21 and with the fuel supplied from the fuel circuit of the internal combustion engine. The ignition device includes ignition electrodes which extend into the combustion chamber and are fired through the use of ignition pulses from the electronic control device 16. Other components of the burner system, such as metering valves, air shut-off valves and pressure regulators, have been omitted for reasons of clarity and are indeed not necessary for the understanding of the process according to the invention. The detailed structure of a burner system of this kind and its control can be taken from document German Published, Non-Prosecuted Patent Application DE 41 32 814 A1, for example.

Referring to FIG. 2, at a time t0 (engine start), the internal combustion engine 10 is started and both the secondary air pump 21 and the ignition of the burner 24 are switched on through the use of corresponding signals from the electronic control device 16. Since the secondary air pump 22 requires a certain start-up time before the air required for combustion is available in the combustion chamber of the burner 24, the fuel for the burner 24 is released by opening the fuel shut-off valve 25 only after a time delay T BR, at time t1 shown in FIG. 2 (burner start). During this time, the secondary air supply and the ignition device of the burner 24 are monitored in a manner that is known per se, by checking the secondary voltage of the ignition device, for example. If this check reveals that the ignition is faulty or there is insufficient or no secondary air, the fuel supply to the burner 24 remains shut off. If both the ignition and the secondary air supply to the burner are recognized as being operational, the fuel supply to the burner is connected. Once the fuel has been connected, the combustion process is monitored with the aid of the ignition voltage at the ignition plugs of the burner.

In order to carry out the diagnosis of the burner air ratio while the burner is still operating, both lambda probes LS1, LS2 are operated at maximum power from the engine start (time t0). If cyclic activation of the probe heating systems is employed, this means that the two lambda probes LS1, LS2 are activated with a 100% duty cycle. A predetermined time T LD is determined on a test bed and is essentially dependent on the structure and location of installation of the lambda probes. After the predetermined time T LD has expired, both lambda probes have been heated up to their operating temperature and are thus ready to emit a rich/lean output signal in accordance with the residual oxygen content in the exhaust gas upstream and downstream of the three-way catalytic converter 14 of the internal combustion engine 10.

However, diagnosis of the burner air ratio is only started at a point t2, after the expiration of the time T LD if, in addition to the above-mentioned conditions, no diagnosed faults in the two lambda probes, the lambda closed-loop control device nor the long-term adaptation system have been stored. For this purpose, the contents of a fault memory 27 contained in the electronic control device 16 are read out and appropriately evaluated.

At the beginning of the diagnosis (time t2) of the burner air ratio, which is also referred to below as burner lambda $\lambda_{BR}$, a distinction is drawn between four different cases depending on the values of the output signals ULS1, ULS2 of the two lambda probes LS1, LS2 at that time:

Case 1:
the lambda probe LS1 upstream of the catalytic converter is indicating a lean mixture (air ratio $\lambda_{ULS1}>1.00$) and
the lambda probe LS2 downstream of the catalytic converter is likewise indicating a lean mixture (air ratio $\lambda_{ULS2}>1.00$)

Case 2:
the lambda probe LS1 upstream of the catalytic converter is indicating a rich mixture (air ratio $\lambda_{ULS1}<1.0$) and
the lambda probe LS2 downstream of the catalytic converter is likewise indicating a rich mixture (air ratio $\lambda_{ULS2}<1.00$)

Case 3:
the lambda probe LS1 upstream of the catalytic converter is indicating a rich mixture (air ratio $\lambda_{ULS1}<1.00$) and
the lambda probe LS2 downstream of the catalytic converter is indicating a lean mixture (air ratio $\lambda_{ULS2}>1.00$)

Case 4:
the lambda probe LS1 upstream of the catalytic converter is indicating a lean mixture (air ratio $\lambda_{ULS1}>1.00$) and
the lambda probe LS2 downstream of the catalytic converter is indicating a rich mixture (air ratio $\lambda_{ULS2}<1.00$).

Since, in the case of the conventional burner systems (e.g.: German Published, Non-Prosecuted Patent Application DE 41 32 814 A1), secondary air is additionally injected into the exhaust line upstream of the burner and furthermore, the burner is to be operated at an air ratio of about $\lambda=1.05$, Case 1 is the one which normally occurs. In this case, the fuel/air mixture of the internal combustion engine 10 is enriched from the time t2 for the purpose of diagnosing the burner lambda. Enrichment is by a factor TI_BR, which is increased in steps from the value 1.0 in accordance with the following relation:

$$TI\_BR_{new}=TI\_BR_{old}+TI\_BR_{INC}.$$

The expression $TI\_BR_{INC}$ in this case represents a fixed amount by which the value of the enrichment factor is increased in each predetermined time unit.

Enrichment is ended when either the output signals ULS1, ULS2 of the two lambda probes LS1, LS2 indicate a rich mixture or if a predetermined limiting value TI_BR_MAX for the enrichment is reached, which is irrespective of whether or not the two lambda probes have already detected a rich mixture. In both cases, the enrichment factor TI_BR is reset to a value of 1.0.

If the output signal ULS2 of the lambda probe LS2 does not indicate a rich mixture composition during enrichment up to the maximum value TI_BR=TI_BR_MAX even though, due to the enrichment, the output voltage ULS1 of the lambda probe LS1 assumes a value which indicates a rich mixture, the air ratio of the burner 24 is classified as incorrect.

If, on the other hand, the output signal ULS1 of the lambda probe LS1 does not jump during enrichment from its initial state, which indicates a lean mixture, to a state which represents a rich mixture, it is to be assumed that there is either an error in the air ratio of the mixture fed to the internal combustion engine or a fault in lambda probe LS1. In this case, diagnosis is aborted and repeated when the burner is next started, and no entry is made in the fault memory 27.

The value for the enrichment factor TI_BR at which the output signal ULS1 of the lambda probe LS1 indicates a rich mixture (time t3) is denoted as TI_F1 and the value for the enrichment factor TI_BR at which the output signal ULS2 of lambda probe LS2 indicates a rich mixture (time t4) is denoted as TI_F2 (FIG. 2). The values TI_F1, TI_F2 are buffered in a memory 28 of the electronic control device 16.

In addition, the times t3 and t4 at which the output signals ULS1 and ULS2 indicate a rich mixture are detected and the time period T_SU between the probe switchovers is calculated therefrom by difference formation and is likewise buffered in the memory 28 for the further diagnosis of the burner lambda. The time T_SU is positive if the lambda probe LS1 indicates a rich mixture first, followed by the lambda probe LS2 (example shown in FIG. 2, Case 1), and the time T_SU is negative if the lambda probe LS2 indicates a rich mixture first, followed by the lambda probe LS1.

In order to take account of the propagation time of the exhaust gas from the lambda probe LS1 to the lambda probe LS2, the enrichment factor TI_F2 at which the lambda probe LS2 indicates a rich mixture is corrected in accordance with the following relation:

$$TI\_FK2=TI\_F2-(TI\_F2-TI\_F1)*TI\_LS/TI\_SU,$$

where the value TI_FK2 denotes the corrected enrichment factor and TI_LS denotes a dead time which takes account of the gas propagation time between the two probes.

Using the enrichment factor TI_FI and the corrected enrichment factor TI_FK2, the air ratio of the burner (burner lambda) $\lambda_{BR}$ can be determined:

$$\lambda_{BR} = \frac{ML\_BKM}{ML\_BR*14,7} *(TI\_FAK2*TI\_FK2 - TI\_FAK1*TI\_F1)+1$$

where:
- ML_BKM is the air mass flow which is fed to the internal combustion engine during diagnosis (determined by the air-mass meter)
- ML_R is the air mass flow which is fed to the burner during diagnosis (fixed value)
- TI_FAK1,2 represents all of the other enrichment factors applied in the electronic engine control for the warm-up of the internal combustion engine, at the times t3 and t4 at which the output signals of the two lambda probes indicate a very rich mixture.

In order to assess the ability to function of the burner, the air ratio of the burner $\lambda_{BR}$ calculated in accordance with the formula given above is compared with specified limiting values. If the air ratio of the burner $\lambda_{BR}$ is outside the limits $$\lambda_{BR\_MAX} < \lambda_{BR} < \lambda_{BR\_MIN}$$

(e.g.: $\lambda_{BR\_MAX}=1.15$, $\lambda_{BR\_MIN}=0.95$),
reliable functioning of the burner 24 can no longer be guaranteed and a corresponding entry is made in the fault memory 27 of the electronic control device 16. At the same time, the result of the check can be communicated acoustically and/or visually to the driver of the vehicle and the heating up of the catalytic converter through the use of the burner can be suppressed when the internal combustion engine 10 is next started.

If, on the other hand, before the start of diagnosis, both lambda probes LS1, LS2 indicate a rich mixture (Case 2), the fuel/air mixture of the internal combustion engine 10 is diluted from the time t2 for the purpose of diagnosing the burner lambda $\lambda_{BR}$. Dilution is likewise effected by way of the factor TI_BR, which is reduced in steps starting from the value 1.0 in accordance with the following relation:

$$TI\_BR_{new}=TI\_BR_{old}-TI\_BR_{INC}.$$

The process of dilution is ended when either both lambda probes have detected a lean state or when a predetermined limiting value TI_BR_MIN for the dilution has been reached, irrespective of whether or not the two lambda probes have already detected a lean mixture. In both cases, the factor TI_BR is then reset to a value of 1.0.

If the lambda probe LS2 does not exhibit a voltage jump during dilution to the limiting value TI_BR=TI_BR_MIN even though the lambda probe LS1 has already detected a lean mixture due to the dilution, the air ratio of the burner 24 is classified as incorrect. If, on the other hand, the lambda probe LS1 does not reach a voltage jump during the dilution, it is to be assumed that either there is an error in the air ratio of the mixture fed to the internal combustion engine or a fault in lambda probe LS1. In this case, diagnosis is aborted and repeated when the burner is next started. No entry is made in the fault memory 27.

The values at which the lambda probes LS1, LS2 detect a lean mixture (dilution factors at the voltage jumps) and the time between the voltage jumps are detected and further evaluation is performed in a manner corresponding to that illustrated through the use of Case 1.

If the lambda probes LS1, LS2 indicate different mixture compositions before the beginning of diagnosis, i.e. the lambda probe LS1 is indicating a rich mixture while the lambda probe LS2 is indicating a lean mixture (Case 3), or vice versa (Case 4), the state of the signal of the lambda probe LS1 must be changed by diluting (Case 3) or enriching (Case 4) the fuel/air mixture of the internal combustion engine since the diagnosis described with reference to Case 1 can only be carried out when the probe signals are in the same direction. This is accomplished through the use of a dilution or enrichment function of the kind explained with reference to Cases 1 and 2. If, during this phase, the dilution factor or enrichment factor reaches its limiting value without a change in state occurring in the signal of the lambda probe LS1 upstream of the catalytic converter, diagnosis is aborted.

If, due to dilution or enrichment, the lambda probe LS1 upstream of the catalytic converter indicates the same mixture composition as the lambda probe LS2 downstream of the catalytic converter, within the limiting value, further diagnosis is performed in accordance with the method described with reference to Cases 1 and 2.

We claim:

1. A process for checking the ability to function of a burner being disposed in an exhaust pipe of an internal combustion engine and being operated with a fuel/air mixture for heating up an exhaust-gas catalytic converter of the internal combustion engine, which comprises:

placing first and second lambda probes respectively upstream and downstream of the exhaust-gas catalytic converter;

emitting output signals from each of the lambda probes corresponding to a respective residual oxygen content in the exhaust gas;

representing rich and lean mixture compositions with signal levels of the output signal;

detecting the signal levels of output voltages of both of the lambda probes;

selectively enriching and diluting the fuel/air mixture of the internal combustion engine at a function of the signal levels by enrichment and dilution factors until both lambda probes change their signal levels;

detecting values then occurring for the enrichment and dilution factors;

determining an air ratio of the burner from the values for the enrichment and dilution factors and from air masses fed to the burner and the internal combustion engine during checking; and comparing the air ratio of the burner with predetermined limiting values, and classifying the burner as currently not capable of operating properly if the air ratio of the burner is outside the limiting values.

2. The process according to claim 1, which comprises changing the enrichment and dilution factors in steps up to a limiting value.

3. The process according to claim 1, which comprises correcting the enrichment and dilution factors at which the output signal of the lambda probe downstream of the catalytic converter changes its signal level by a dead time obtained from a propagation time of exhaust gas between the two probes.

4. The process according to claim 1, which comprises correcting the enrichment and dilution factors by a warm-up factor taking account of a warming up of the internal combustion engine.

5. The process according to claim 1, which comprises aborting the process if the output signal of the lambda probe upstream of the catalytic converter does not change its signal level within limits for the enrichment and dilution factors.

6. The process according to claim 1, which comprises heating the lambda probes for a predetermined time period before a start of checking the burner.

* * * * *

UNITED STATES PATENT AND TRADEMARK OFFICE
CERTIFICATE OF CORRECTION

PATENT NO. : 5,634,330

DATED : June 3, 1997

INVENTOR(S) :. Erwin Achleitner et al.

It is certified that error appears in the above-identified patent and that said Letters Patent is hereby corrected as shown below:

Title page:

Item [30] should read as follows:

Sept. 30, 1994 [DE]   Germany.................44 35 196.8

Signed and Sealed this

Tenth Day of March, 1998

*Attest:*

BRUCE LEHMAN

*Attesting Officer*   Commissioner of Patents and Trademarks